No. 642,587. Patented Feb. 6, 1900.
F. H. DAVIS.
APPARATUS FOR BORING.
(Application filed Oct. 12, 1898.)
(No Model.) 5 Sheets—Sheet 1.
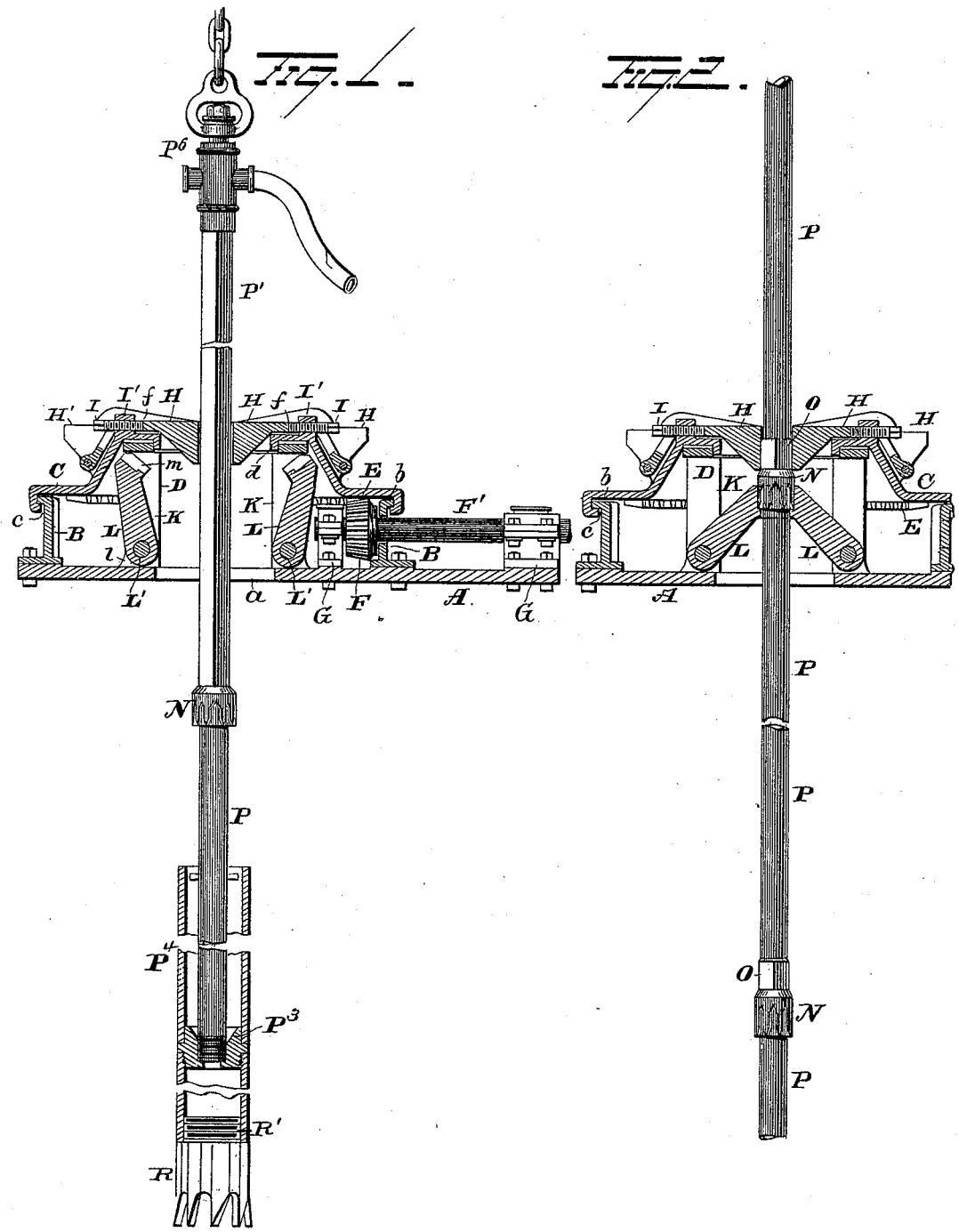
WITNESSES
INVENTOR

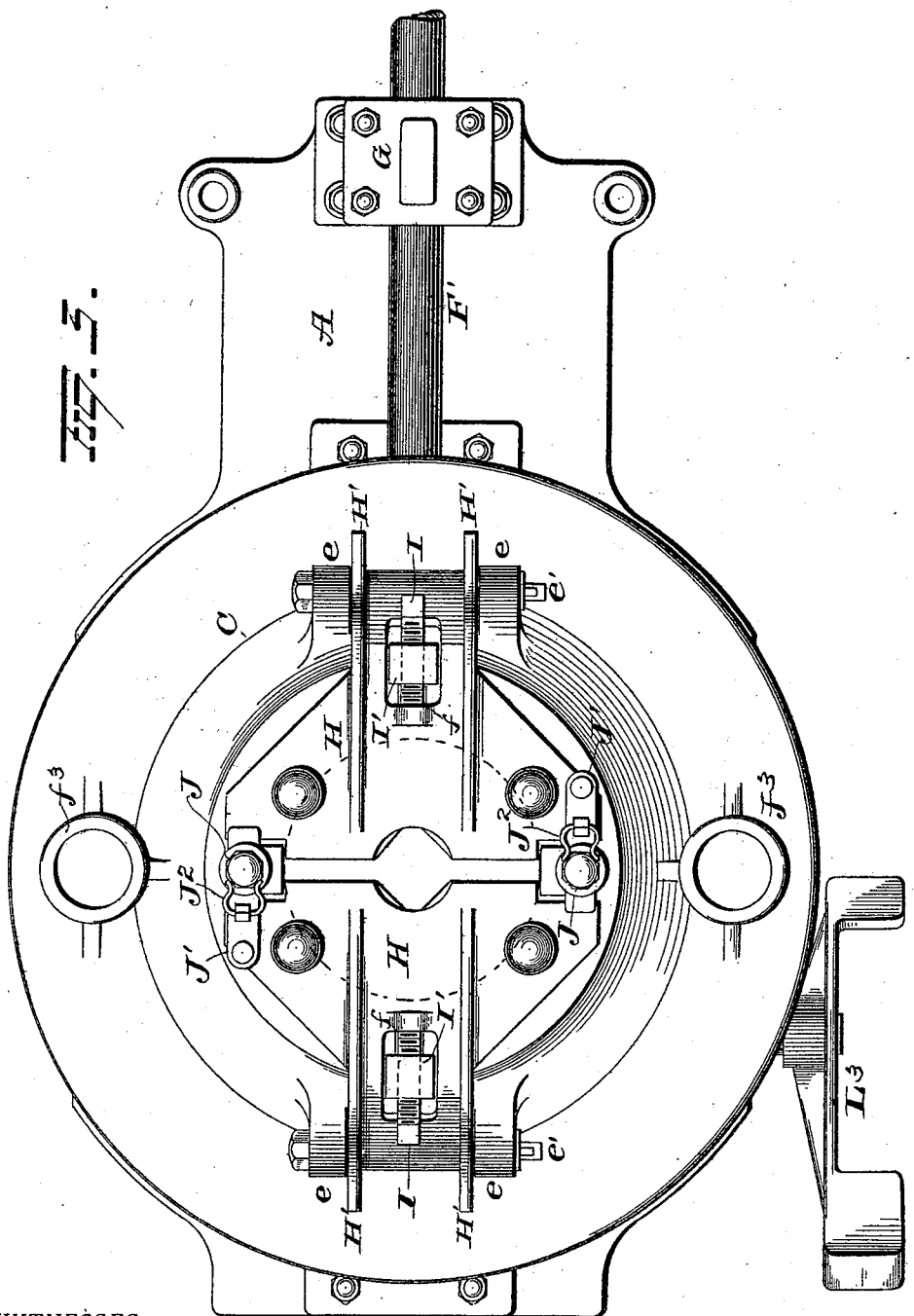

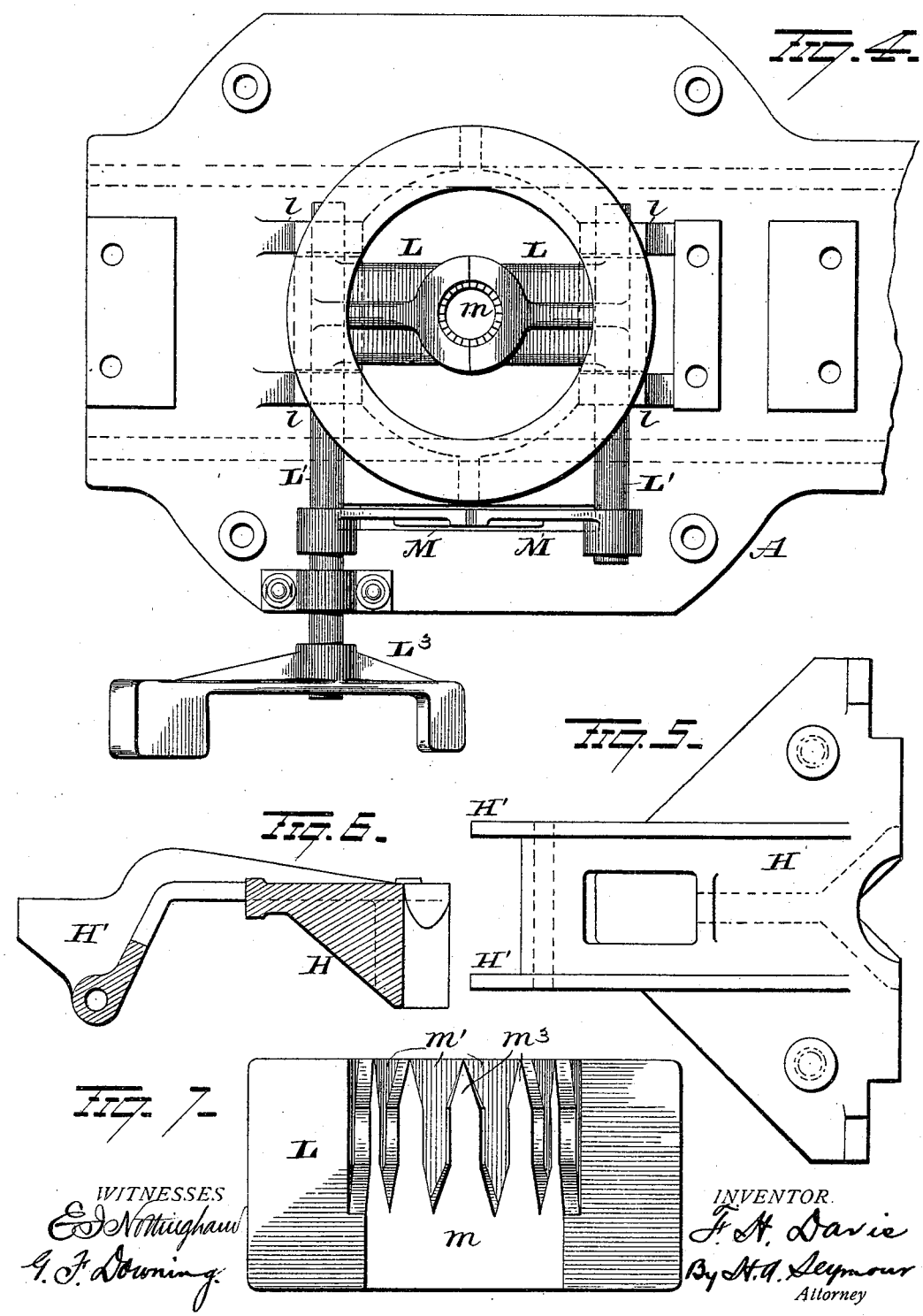

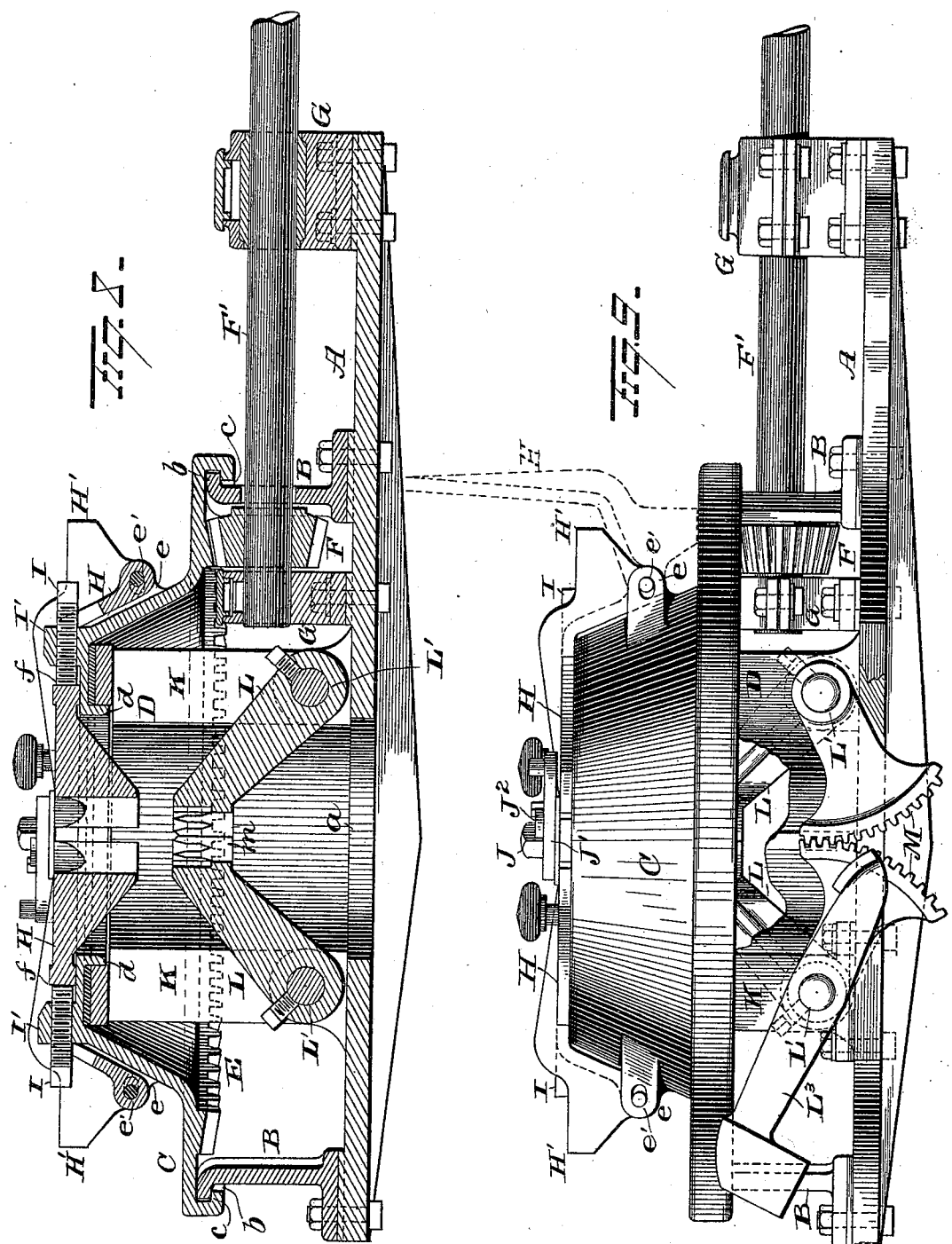

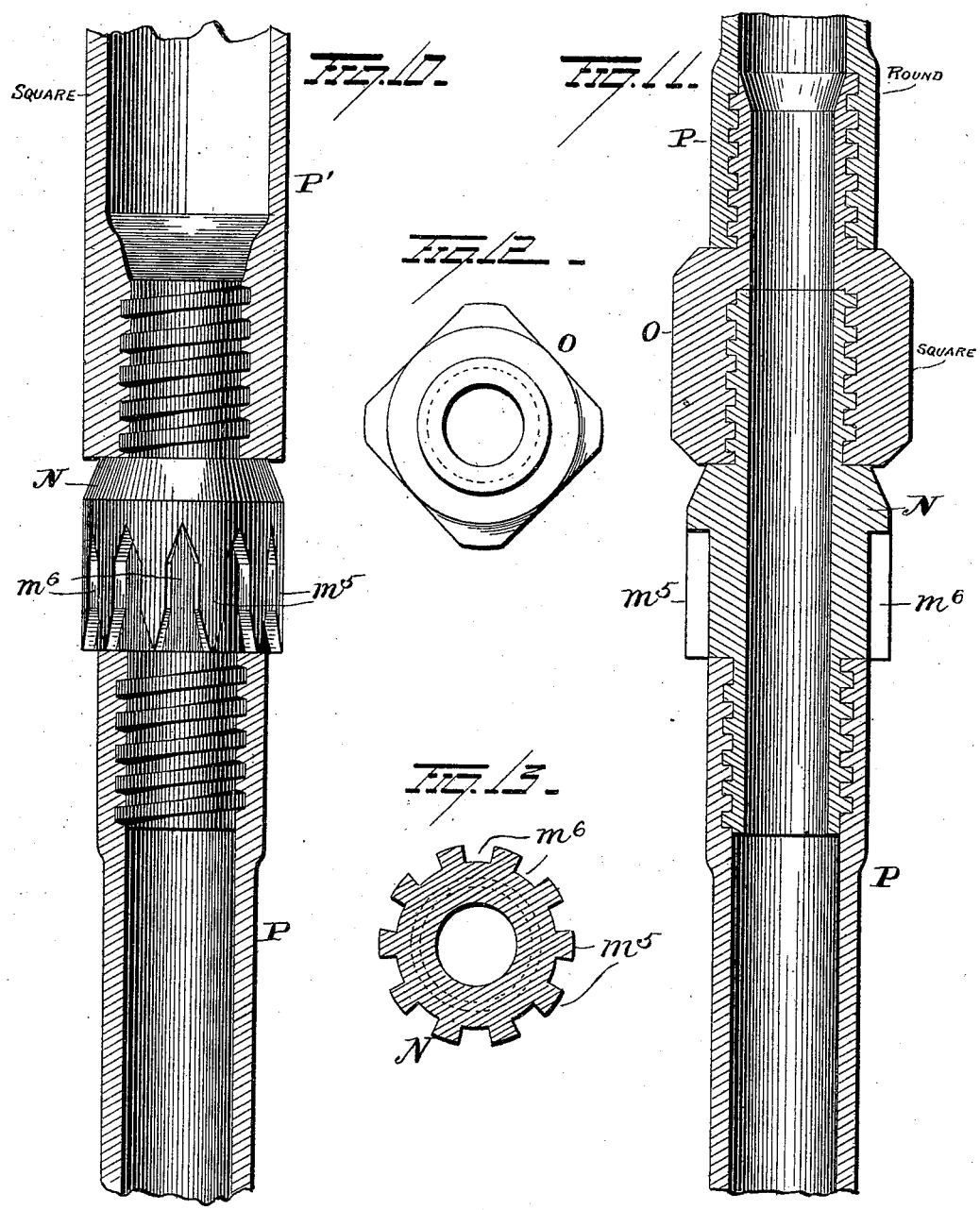

UNITED STATES PATENT OFFICE.

FRANCIS HARLEY DAVIS, OF NEW YORK, N. Y.

APPARATUS FOR BORING.

SPECIFICATION forming part of Letters Patent No. 642,587, dated February 6, 1900.

Application filed October 12, 1898. Serial No. 693,323. (No model.)

*To all whom it may concern:*

Be it known that I, FRANCIS HARLEY DAVIS, of New York city, in the county of New York and State of New York, have invented certain new and useful Improvements in Apparatus for Boring; and I do hereby declare the following to be a full, clear, and exact description of the invention, such as will enable others skilled in the art to which it appertains to make and use the same.

My invention relates to an improvement in mechanism designed for use in sinking wells, borings for prospecting purposes, or the like, the object being to provide means for rotating and feeding the drill and for automatically connecting and disconnecting the drill-rod sections when inserting or withdrawing them from the bore-hole.

With these ends in view my invention consists in the parts and combination of parts, as will be more fully described, and pointed out in the claims.

In the accompanying drawings, Figure 1 is a view in section and partly in elevation, showing the parts in position for boring. Fig. 2 is a similar view showing the parts in position for connecting or disconnecting two cylindrical sections of the drill-tube. Fig. 3 is a view in plan of the drill-operating device. Fig. 4 is a similar view showing the dome removed. Fig. 5 is a plan view of one of the clamping-jaws. Fig. 6 is a sectional view of the same. Fig. 7 is a view in end elevation of the upper end of one of the coupling-supporting arms. Fig. 8 is a section, and Fig. 9 a side elevation, of the drill-actuating devices. Fig. 10 is a view in section showing a round and a square drill-rod section coupled together. Fig. 11 is a similar view showing round sections coupled. Fig. 12 is a view in section through the coupling O, and Fig. 13 is a similar view through the coupling N.

A represents the base-plate, provided with an aperture $a$ slightly larger than the bore and adapted to permit of the free passage of the casing or tools used.

Rigidly secured to the upper face of the base A and concentric with the aperture $a$ are the two segmental guides B, located at diametrically opposite points and provided at their upper edges with outwardly-projecting flanges $b$, which latter rest in the groove $c$ of the dome C and hold the latter against vertical and lateral displacement. The dome C is preferably shaped as shown and is supported centrally by the cylindrical bearing D, the upper flat face of which carries an antifriction-washer, which latter rests in contact with the lower face of the dome C. The dome is provided with a depending flange $d$ concentric with its axis, which bears against the inner edge of the top of cylinder D and assists in preventing any lateral movement of the dome and also prevents grit or the like from getting into the bearing. The dome is provided on its lower face with a beveled gear E, integral with or secured to said dome and meshing with the bevel-pinion F, secured on the shaft F', which latter is supported in the pillow-blocks G and is coupled to the driving mechanism of the engine. The dome is provided centrally within the depending flange $d$ with an opening or aperture in line with the aperture $a$ in the base A, within which rest the inner ends of the clamping-jaws H. These jaws when closed approximately cover the aperture or opening in the dome, except at the center, where an opening is formed in the two jaws to receive the drill-rod. This opening may be of any suitable shape other than a circle; but I prefer to have it square to receive and engage the sides of a hollow square drill-rod. The jaws H are hinged at their rear ends to the brackets $e$, integral with the dome, the brackets having elongated holes, which permit of a longitudinal traversing movement of the jaws, so as to permit them to be adjusted toward and away from each other. To prevent the jaws spreading or separating, I have provided adjusting-screws I, which latter pass through female-threaded openings in the upwardly-projecting lugs I' in the top of the dome and bear against the jaws at the points $f$. By means of these screws the jaws can be adjusted to compensate for wear and also act as a vise or clamp for holding the tools up from the bottom of the bore while adding another length or rod. The jaws are provided at their rear ends each with a tailpiece H', which acts as a stop and sustains the jaws in an inclined position slightly beyond their centers of gravity when the jaws are opened, as is the case when inserting a casing, core-barrel, &c. The dome is further provided on its top with two diametrically opposite sockets $f^3$, adapted to receive removable standards which are used as a means for rotating a horizontal cross-head or other device rigidly clamped to the core-barrel or to the casing, as the case may be.

Formed integral with the top of the dome and at points intermediate the lugs I' are the bosses J, which form seats for the latches J'. These bosses are located between the clamping-jaws H, which latter are cut away adjacent to the bosses, and the latches J' are designed to overlap both jaws and hold them in their closed positions. The latches are pivoted on screw-bolts secured to the bosses and are held against accidental movement by the spring-locks $J^2$, carried by the latches, with their free ends engaging the angular heads of the bolts.

The cylinder D, which, as before stated, is rigid with the base A, is provided at diametrically opposite points with two openings K, within which are mounted the drill-supporting arms L. These arms L are each secured to a shaft L', mounted in bearings $l$ on the base $a$, and when open or separated rest within the openings K, thus permitting the largest-sized tools to be passed through the dome and base and when closed or in a position to support the drill rest in inclined positions, with their upper ends in contact with each other or in contact with the drill-rod. One shaft L' extends beyond the side of the base A and is provided with a treadle $L^3$, suitably weighted to normally sustain the arms L in their vertical positions after having been moved to such position by the foot of the operator, and both shafts carry intermeshing segment-gears M, which latter operate to actuate both arms simultaneously. The weight of the arms L is sufficient to sustain them in their closed position, (shown in Fig. 2,) and when in their closed position they operate to grasp the drill-rod coupling and not only sustain the drill-rod in a suspended position, but, owing to their construction, also prevent it from being turned. The upper ends of these arms L are bent inwardly toward each other, so that when the arms are closed the bent upper ends are horizontal, and the upper ends are each provided with preferably a semicircular recess $m$ in its meeting face, (shown in Fig. 7,) so that when the arms are closed or together the two recesses receive the couplings connecting the rod-sections. The wall of each recessed end is also provided with a series of tapered grooves $m'$ and corresponding intermediate ribs $m^2$, the grooves being pointed or narrowed at their lower ends and enlarged at their upper ends, and the ribs $m^2$ are correspondingly pointed at their upper ends and narrowed at their lower ends.

Two couplings N and O are secured together by male and female threads, and these two couplings connect adjacent sections P of the drill-tube. The lower coupling N conforms in contour externally with the recesses $m$ in the arms L, while the coupling O is angular externally to conform to the contour of the space between the clamping-jaws H. When the lower coupling N is between the arms L, the upper coupling O is clamped between the jaws H, and as the lower coupling N is provided with ribs $m^5$ and grooves $m^6$, corresponding in size and shape with the ribs $m^2$ and grooves $m'$ in the arms L, it will be seen that the drill-rod will not only be supported or suspended by the arms L, but as the ribs $m^5$ of the coupling N enter the grooves $m'$ in the arms L and the grooves $m^6$ in the coupling N receive the ribs $m^2$ of the arms L it will be seen that the coupling is securely locked against rotation. The upper coupling O, as before stated, corresponds in shape to the shape of the recesses in the clamping-jaws H, and hence it will be seen that if the dome carrying the jaws be rotated the upper coupling O will be rotated and be either screwed in or unscrewed from the lower coupling N. Hence in the operation of withdrawing the drill from the bore-hole the sections are drawn up until the lower coupling N of the upper pair of couplings is in a position to be engaged by the arms L. When the drill is down and working, the arms are thrown back into the recesses K; but when withdrawing the drill the arms are first thrown over into contact with the rod and, trailing against same, are automatically opened by contact with the coupling. Hence by elevating the drill-rods until the coupling is slightly above the arms and then lowering until the coupling N clutches into the toothed recess formed in the arms L the drill-rod is held suspended and clamped by the arms.

By turning the dome in the reverse direction from that in which it moved while drilling it will be seen that the upper coupling O, carrying a section of drill-rod, will be unscrewed, thus leaving it free to be moved. By now elevating the drill-rod until the next pair of couplings are reached the upper section of the rod, with its coupling, is removed in the same manner, and so on until all the boring-rods have been withdrawn.

When inserting the drill in the bore-hole, the sections of the drill-rod are added by supporting the upper end of the first section of the tube in the arms L and placing an additional section on the first section and then rotating the dome in the direction it is rotated in drilling.

In practice I prefer to use round hollow drill-rods P below the surface and angular rods P' above and at points near the surface, a section of the angular rod while drilling being always between the jaws H, and being angular (or of a shape other than circular) is engaged directly by the jaws H and is rotated thereby, the jaws simply applying torsional strain against the angular sides of the rod, but do not grip them sufficiently to prevent free movement up or down.

The drill used in connection with this apparatus is preferably the Davis calyx drill, which consists of a bit or cutter R of cylindrical shape secured at its upper end to a core-barrel R', and the drill-rods P and P' are connected to the core-barrel by a reducing-plug P³. Secured to the reducing-plug and extending upwardly around the drill-rod for a suitable distance is a pipe or cup P⁴, which receives the fragments of rock detached by the drill-teeth. Water is forced down through the water-swivel P⁶ and hollow drill-rods P P' into the core-barrel and drill and passes out into the bore between the teeth of the drill and rises on the outside of the core-barrel and cup with considerable velocity owing to the limited space between the tubes and the wall of the bore. After it passes above the top of the cup P⁴ the speed is diminished, owing to the increased space, and the chips, following the line of least resistance, gravitate into the cup P⁴ and are withdrawn when the rods are withdrawn for the removal of the core.

It is evident that numerous slight changes might be resorted to in the relative arrangement of parts herein shown and described without departing from the spirit and scope of my invention. Hence I would have it understood that I do not wish to restrict myself to the exact construction herein shown and described; but, Having fully described my invention, what I claim as new, and desire to secure by Letters Patent, is—

1. In an apparatus for boring, the combination with a drill-rod made up of sections and two connected couplings interposed between adjacent sections of the rod, of a clamp carried by a stationary support and adapted to engage the lower coupling of each pair and support the same, and a device adapted to be continuously rotated and to engage the upper coupling and permit a longitudinal movement thereof, whereby a rotary movement of the rotary device operates to connect or disconnect the two couplings.

2. In an apparatus for boring, the combination with a drill-rod made up of angular and round sections and a coupling connecting the angular rod with the adjacent round rod, of a clamp carried by a stationary support for engaging the lower part of the coupling so as to support the same and hold it against rotation and a device adapted to be continuously rotated and to engage the angular rod whereby a rotary movement of the rotary device operates to connect or disconnect the angular and round sections.

3. In an apparatus for boring, the combination with a stationary base and a rotary dome thereon, the base having pivoted clamping-arms and the rotary dome having an angular opening therein, of a drill-rod the upper section of which is angular in cross-section and a coupling connecting the sections of the rod, the said coupling having ribs adapted to rest in corresponding grooves in the arms.

4. In an apparatus for boring, the combination with a base and a rotary dome mounted thereon, of a sectional drill-rod, means carried by the dome for engaging the upper section of said drill-rod and turning it, a coupling connecting the sections of the rod, ribs on said coupling and a locking device disposed below the dome and adapted to engage the ribbed coupling.

5. In an apparatus for boring, the combination with a drill-rod made up of sections and two connected couplings intermediate and connecting adjacent sections of the rod, the upper of said couplings being angular in cross-section and the other having ribs and grooves on its outer face, of a clamp carried by a stationary support and provided with ribs and grooves corresponding with the grooves and ribs on the coupling whereby when the coupling is grasped by the clamp it is sustained thereby and prevented from rotating, and a rotary device engaging the angular coupling whereby a rotary movement of the rotary device operates to connect or disconnect the two couplings.

6. The combination with a stationary base and a dome mounted to rotate thereon, said dome having an axial opening, some part of the wall of which is eccentric to the axis of the dome, of a coupling having one section conforming in contour to said opening in the dome and having ribs on the other section, and arms pivoted on the base and adapted at their free ends to interlock with said ribs on the coupling-section and support the drill-rod depending therefrom.

7. The combination with a stationary base and arms pivoted thereto, said arms having their ends adapted to bear against each other and form a socket for a coupling, of a rotary dome mounted on the base and connected to and adapted to transmit rotary motion to a drill-rod.

8. The combination with a base having an opening therein, of a dome mounted on said base, means for connecting said dome with an upper section of a drill-rod for turning the same, shafts mounted on the base at respective sides of said opening, arms secured to said shafts and coöperating to support another section of the drill-rod and prevent it from turning and devices connecting said shafts to cause them to be turned simultaneously and to move said arms toward or away from the drill-rod.

9. The combination with a base, arms pivoted thereto and coöperating to support a lower section of a drill-rod and means also mounted on the base for causing the arms to move in unison to or from the drill-rod, of a rotary dome over said pivoted jaws, clamping-jaws hinged to said dome and adapted to connect the dome and drill-rod and means for locking said jaws down on the dome.

In testimony whereof I have signed this specification in the presence of two subscribing witnesses.

FRANCIS HARLEY DAVIS.

Witnesses:
 G. F. DOWNING,
 C. S. DRURY.